United States Patent [19]

Thomas

[11] 3,875,516

[45] Apr. 1, 1975

[54] DISCRIMINATOR CIRCUITS

[75] Inventor: Alan John Thomas, Petersham, Richmond, England

[73] Assignee: The Rank Organisation Limited, London, England

[22] Filed: Oct. 26, 1973

[21] Appl. No.: 410,218

[52] U.S. Cl. ............... 328/146, 250/564, 328/114, 328/132, 328/151, 328/235 A, 356/201
[51] Int. Cl. .............................. H03k 5/00
[58] Field of Search ............ 325/323, 324; 307/235; 328/235 A, 146, 114, 151; 329/104, 105, 106, 107, 108, 109, 131, 132; 356/201, 181, 564

[56] References Cited
UNITED STATES PATENTS
3,374,435   3/1968   Engel ............................ 325/324
3,721,911   3/1973   Aranguren ..................... 328/146

Primary Examiner—John Kominski
Attorney, Agent, or Firm—Brisebois & Kruger

[57] ABSTRACT

A discriminator circuit for use in detecting wanted information which is interspersed with noise signals or such like unwanted information. The discriminator circuit comprises a controlled switch which is connected between the input and the output of the circuit to pass the input signal when the gate is open and to lock the input signal when the gate is closed. The undesired parts of the signal are prevented from passing the gate by means of two circuit arrangements, one sensitive to the magnitude of the signal, operating to close the gate when the magnitude of the input signal exceeds a value set on the circuit, and one sensitive to the rate of change of the input signal, operating to close the gate when the input signal changes by a rate greater than a predetermined rate set on the circuit.

9 Claims, 5 Drawing Figures

DISCRIMINATOR CIRCUITS

The present invention relates to discriminator circuits, and particularly to an improved discriminator circuit capable of detecting unwanted or spurious changes in an information signal.

The present invention finds particular utility in connection with a device for determining the optical characteristics of a liquid in a flowing stream, of a type which operates to pass the stream of liquid past a sensor and to detect the characteristics of the liquid by directing a beam of light therethrough, the modification to the light being indicative of the characteristics to be detected. In order to overcome various problems such as the unwanted variation due to turbulence in the flowing liquid, or where a mixture of liquid is concerned, to variations in the composition of the mixture as it flows past the sensor, the liquid is broken up by the introduction of gas bubbles into the stream.

Although this overcomes the problems mentioned above in that the desired characteristics of the liquid are not obscured by variation in the composition of a mixture, or by turbulence in the flow of the liquid, it does create a fresh problem in that, if electrical detection of the transmitted light is employed, the electric signal from the detector contains irregular portions representing the light transmitted through the gas intercolated with portions of the signal representing the light transmitted through the liquid. Although the sections representing the light transmitted through the gas are of frequent occurrence they are not regular since the length of the gas bubble in the liquid cannot be precisely controlled. Accordingly, it is necessary for the detector to include a discriminator circuit sensitive to the required components of the signal but which will ignore the parts of the signal which are not required.

According to the present invention there is provided a discriminator circuit having an input for the reception of an information signal and means for passing the information signal from the input to an output thereof, the circuit including means sensitive to the signal level operative to prevent the information signal from being passed to the output of the circuit when the signal level passes to a given side of a selected reference level, and means sensitive to the rate of change of the information signal, operative to prevent the information signal from being passed to the output of the circuit when the rate of change of the signal level exceeds a selected rate.

In general, the voltage level of the signal produced by the detector as the gas bubbles move past will be lower than the voltage level of the signal carrying the desired information about the liquid, although in some cases the reverse may be true. Since the discriminator can be set to ignore changes in the input signal which occur at a rate greater than a selected rate, when used in apparatus of the type described above it will also block rapid changes in the output signal due to foreign bodies or small air bubbles in the liquid.

Preferably the means sensitive to the rate of change of the input signal have a greater sensitivity to changes in the signal in one direction than in the other. In this way, the discriminator can be set up to be more sensitive to changes in the input signal in the direction in which the unwanted components of the signal are expected to occur so that the parts of the information signal transmitted by the discriminator are only the desired parts of the signal, the device cutting off as soon as the signal commences to change in the direction to which it is sensitive, and not switching on again until the desired part of the signal has become established.

In a preferred embodiment of the invention the means sensitive to the rate of change of the signal comprise a differentiator circuit which is more sensitive to the rate of change of a decreasing signal than the rate of change of an increasing signal. As mentioned above, it will normally be the case that the wanted parts of the input signal are at a higher voltage level than the unwanted parts of the signal.

Preferably the output of the differentiator circuit is connected in parallel with the output of a comparator circuit to the control gate of a controlled switching element connected between the input and output of the discriminator. The comparator circuit operates to switch off the controlled switching element when the signal passes the selected reference level, and the differentiator circuit operates to switch off the controlled switching element if the rate of change of the signal exceeds a selected rate.

In a preferred embodiment the differentiator circuit comprises a first operational amplifier both inputs of which are fed with the information signal, and the non-inverting input of which is connected to a circuit for slowing the changes in the signal. Thus, as the signal changes in the expected direction the output from the operational amplifier swings first in the opposite direction and then in the same direction as the change in the input signal. Preferably the circuit for slowing the input signal to the non-inverting input of the said first operational amplifier comprises a resistor and a capacitor in parallel.

The differentiator circuit of the preferred embodiment also includes a second operational amplifier the inputs of which are fed from the output of the first operational amplifier via a rectifier network which applies the positive components of the output signal to the non-inverting input, and the negative components of the output signal to the inverting input of the second amplifier, the output from the second amplifier being connected to the said control gate of the controlled switching element. The positive swings of the first amplifier are thus inverted and combined with the negative swings of the first amplifier by the second amplifier.

One embodiment of the invention will now be more particularly described, by way of example, with reference to the accompanying drawings, in which.

Figure 1:
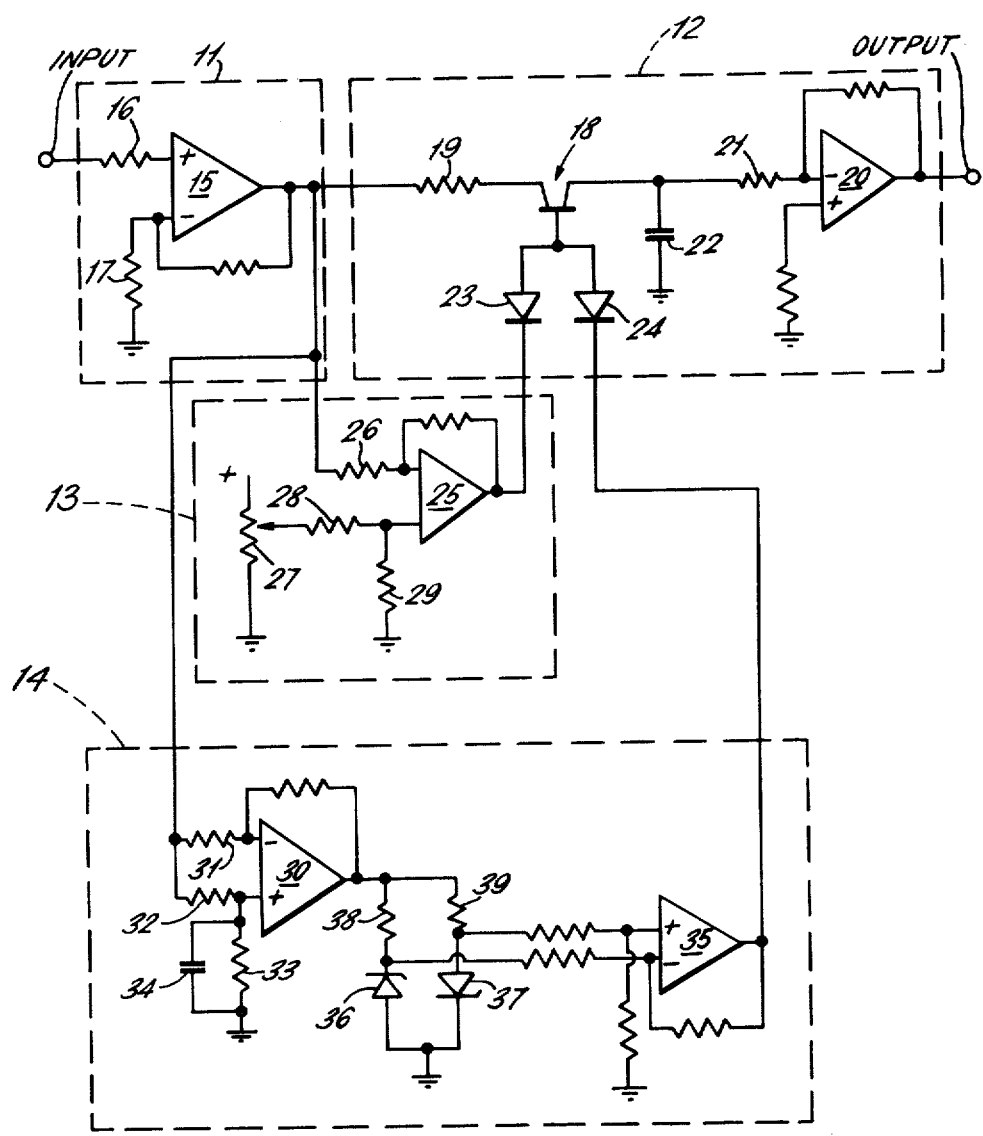
FIG. 1 is a circuit diagram of the embodiment.

Referring now to the drawings, the circuit comprises an input network indicated within the broken line 11, an output network indicated within the broken line 12, a comparator indicated within the broken line 13, and a differentiator indicated within the broken line 14. The input network comprises an operational amplifier 15 the non-inverting input of which is fed with the information signal via a resistor 16 and the inverting input of which is earthed via a resistor 17. The amplifier 15 serves as a buffer amplifier and low impedance driver to the comparator 13 and the output network 12.

The output network 12 comprises a field effect transistor 18 coupled to the output of the amplifier 15 via a resistor 19, and to the inverting input of an amplifier 20 via a resistor 21. The field effect transistor 18 is also connected to an earthed capacitor 22 which, together with the resistor 19 forms an RC network of relatively long time constant which ensures that an average value of the voltage signal is passed to the output via the amplifier 20.

The control gate of the field effect transistor 18 is connected to the anodes of two diodes 23 and 24 respectively. The diodes 23 and 24 are connected in parallel to the field effect transistor 18 and the cathodes of each are respectively connected to the comparator 13 and the differentiator 14.

The comparator 13 comprises an operational amplifier 25 the inverting input of which is fed with the information signal from the output of the amplifier 15 via a resistor 26, and the inverting input of which is fed with a reference voltage level from an adjustable potentiometer 27, via a series resistor 28 and an earthed resistor 29. The output from the amplifier 25 is connected to the cathode of the diode 23. The output signal from the amplifier 15 is also fed to the differentiator circuit 14 which comprises an operational amplifier 30 both inputs of which are fed with the input signal from the amplifier 15 via respective resistors 31 and 32. The non-inverting input of the amplifier 30 is earthed via an RC network comprising a resistor 33 and a capacitor 34 in parallel. The output from the amplifier 30 is passed to an amplifier 35 via a network comprising a pair of diodes 36 and 37 in parallel and earthed, each diode being in series with a respective resistor 38, 39 and the inverting input of the amplifier 35 being connected to the junction between the diode 36 and the resistor 38 while the non-inverting input of the amplifier 35 is connected to the junction between the diode 37 and the resistor 39. The diodes 36 and 37 are arranged such that the positive components of the output signal from the amplifier 30 are passed to the inverting input of the amplifier 35 and the negative components of the output signal from the amplifier 30 are passed to the non-inverting input of the amplifier 35 so that the output from the amplifier 35 comprises negative pulses since the positive components of the output from the amplifier 30 are inverted and combined with the negative components of the output from the amplifier 30 at the output of the amplifier 35.

Figure 2A:
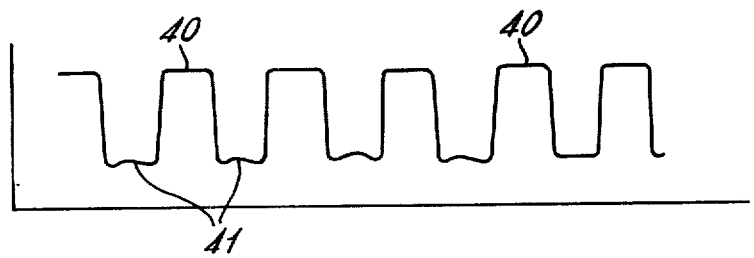
FIGS. 2a, 2b, 2c and 2d are diagrams illustrating various waveforms useful in explaining the operation of the circuit.

A typical information signal which the discriminator might be used to detect is shown in FIG. 2a. The signal comprises a slowly varying voltage level indicated by the reference numeral 40, which is broken up by periodic but irregular changes to a different voltage level indicated by the reference numeral 41. This signal is typical of the type of signal which arises, for example, in the detection of the optical properties of a flowing liquid which is broken up by gas bubbles to prevent undue turbulence of back-mixing in the liquid; the wanted parts 40 of the information signal are formed when the liquid is flowing past the detector, and the unwanted parts 41 of the information signal are formed when the gas bubbles are flowing past the detector. The field effect transducer passes the output from the amplifier 15 to the input of the amplifier 20 when in its conducting state. At the end of one of the wanted sections of the information signal, as the signal starts to change rapidly to the unwanted level 41 the differentiating amplifier 30 detects the rapid rate of change of the signal at the trailing edge and the output from the amplifier 30 swings first positive and then negative as the result of the slowing RC network 33, 34, (as shown in FIG. 2c). As mentioned above, the positive parts of the output from the amplifier 30 are inverted by the amplifier 35 and combined with the negative parts of the output from the amplifier 30. The output from the amplifier 35 is shown in FIG. 2d. This negative pulse is applied via the diode 24 to the control gate of the field effect transistor 18 thereby cutting off the transistor 18 so that the information signal is prevented from passing to the amplifier 20. The RC network comprising the resistor 19 and the capacitor 22 has a relatively large charging time constant so that the differentiator 14 produces the signal which cuts off the transistor 18 before the signal to the input of the amplifier 20 has undergone a significant change.

Figure 2B:
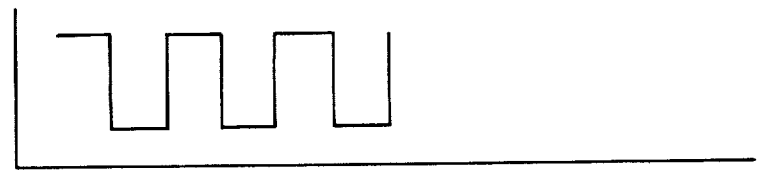
Figure 2C:
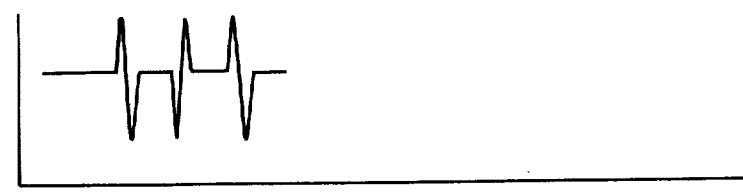
Figure 2D:

As the signal falls below the reference level set by the potentiometer 27 and the resistors 28 and 29 at the input of the amplifier 25, this amplifier produces a negative output, as shown in FIG. 2b, which is applied via the diode 23 to the control gate of the field effect transistor 18 so that during the periods 41 when the information signal is below the reference level the field effect transistor 18 remains cut off. The differentiation obtained by slowing the non-inverting input of the amplifier 30 has the advantage that the sensitivity is asymmetrical, being very fast in response to changes in the signal as it decreases from the portion 40 towards the portion 41 but being relatively slow as the signal returns to the steady state at the next portion 40 so that the signal passed to the amplifier 20 is cut off immediately it starts to depart from the level 40 and is not reconnected until it is well re-established at the level 40 again.

The information signal is thus passed to the amplifier 20 at all times when it is at the level which it is desired to detect and record and relatively slow variations in the level of the wanted part 40 of the signal will be transmitted to the amplifier 20 providing the signal remains above the reference level, whereas any rapid changes in the signal are detected and are prevented from being passed to the amplifier 20 by the differentiator 14. When used as part of the detection circuit for the optical analysis of a flowing liquid such rapid changes may be occasioned either by a liquid/gas interface, or by a foreign body such as dust or small air bubble (less than occlusion size) in the flowing liquid, all of which would produce a spurious result if the signal containing these variations was passed to the recorder.

We claim:

1. A discriminator circuit having input means for receiving an information signal, an output means, and means for passing to said output means at least selected parts of said information signal received at said input means, said discriminator circuit comprising:

controlled switching means connected between said input means and said output means and operative when open to pass to said output means said information signal received at said input means and when closed to block said information signal from said output means, said controlled switching means having a control gate for receiving signals for opening and closing said controlled switching means, first signal sensitive means connected to receive said information signal from said input means and connected to said control gate, said first signal sensitive means being sensitive to the magnitude of said information signal and operating to provide a control signal to close said controlled switching means when said magnitude of said information signal lies to a selected side of a reference level, second signal sensitive means connected to receive said information signal from said input means and connected to said control gate, said second signal sensitive means being sensitive to the rate of change of said information signal and operating to provide a control signal to close said controlled switching means when said rate of change of said information signal exceeds a given value.

2. The discriminator circuit of claim 1, wherein said second signal sensitive means sensitive to said rate of change of said information signal includes a circuit arrangement having an asymmetric sensitivity such that changes in said information signal in a first direction cause a more rapid response than changes in said information signal in the other direction, whereby said control signal from said second signal sensitive means closes said controlled switching means more rapidly than it opens said controlled switching means.

3. The discriminator circuit of claim 2, wherein said second signal sensitive means sensitive to said rate of change of said information signal comprises a differentiator circuit which is more sensitive to the rate of change of said information signal when the latter is decreasing than the rate of change of said information signal when it is increasing.

4. The discriminator circuit of claim 3, wherein said first signal sensitive means and said second signal sensitive means are connected in parallel to said control gate of said controlled switching device which is connected between said input means and said output means of said discriminator circuit.

5. The discriminator circuit of claim 4, wherein said controlled switching device is a field effect transducer.

6. The discriminator circuit of claim 3, wherein said differentiator circuit of said second signal sensitive means includes:

a first operational amplifier having inverting and non-inverting inputs thereto, means for feeding both inputs of said first operational amplifier with said information signal, delay means connected to said non-inverting input of said operational amplifier for delaying said information signal as it is fed to said non-inverting input of said amplifier, whereby said operational amplifier acts as a differentiator.

7. The discriminator circuit of claim 6, wherein said delay means for delaying said information signals fed to said non-inverting input of said first operational amplifier comprises a resistor and a capacitor connected in parallel to said non-inverting input.

8. The discriminator circuit of claim 6 wherein said differentiator circuit includes a second operational amplifier having an inverting input and a non-inverting input, means for feeding said second operational amplifier from the output of said first operational amplifier, said feeding means comprising:

first rectifier means connecting said first operational amplifier output with said non-inverting input of said second operational amplifier, second rectifier means connecting said first operational amplifier output with said inverting input of said second operational amplifier, said first and second rectifier means being connected with opposite polarity whereby positive components of said first operational amplifier output are fed to said inverting input of said second operational amplifier, and said negative parts of said output from said first operational amplifier are fed to said non-inverting input of said second operational amplifier, whereby said second operational amplifier operates to provide a negative output representing the combination of said positive and negative parts of said output from said first operational amplifier.

9. The discriminator circuit of claim 1 wherein said first signal sensitive means sensitive to said information signal level comprises a comparator formed by an operational amplifier having an inverting input and a non-inverting input, means feeding said inverting input of said operational amplifier with said information signal, a reference signal generating circuit, and means feeding a reference signal from said reference signal generating circuit to said non-inverting input of said operational amplifier.

* * * * *